Oct. 1, 1946.  W. H. THOMASON  2,408,456
DRIVE MECHANISM
Filed July 15, 1944    2 Sheets-Sheet 1
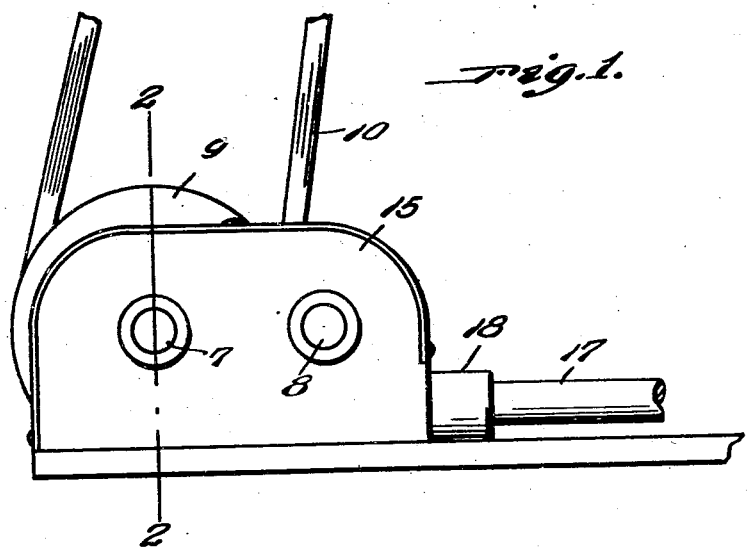
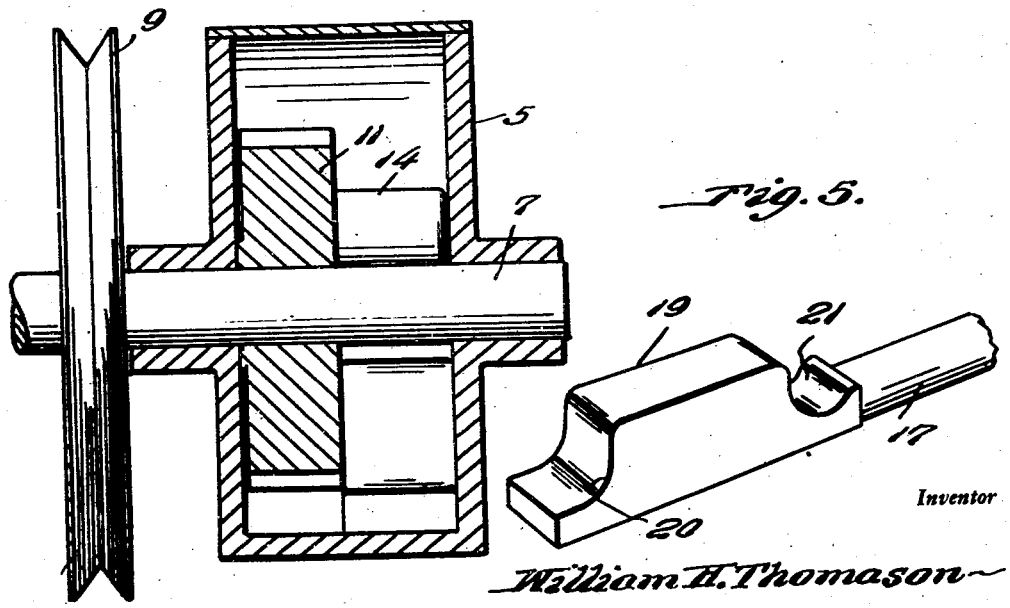
Inventor
William H. Thomason
By Clarence A. O'Brien
and Harvey B. Jackson
Attorneys Oct. 1, 1946.  W. H. THOMASON  2,408,456
DRIVE MECHANISM
Filed July 15, 1944   2 Sheets-Sheet 2

Inventor
William H. Thomason

Patented Oct. 1, 1946

2,408,456

UNITED STATES PATENT OFFICE 2,408,456

DRIVE MECHANISM

William H. Thomason, Margret, Ga.

Application July 15, 1944, Serial No. 545,081

1 Claim. (Cl. 74—49)

The present invention relates to new and useful improvements in drive mechanisms where it is desired to convert rotary to reciprocating motion such as in mowers and various types of shears, as well as for use in combines, binders and other machinery and the invention has for its primary object to provide a drive mechanism of this character of simple and practical construction, which is efficient and reliable in use, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view of the casing in which the mechanism is mounted.

Figure 2 is a sectional view taken substantially on the line 2—2 of Figure 1.

Figure 5 is a fragmentary perspective view of the driven head on the reciprocating member.

Figure 3:
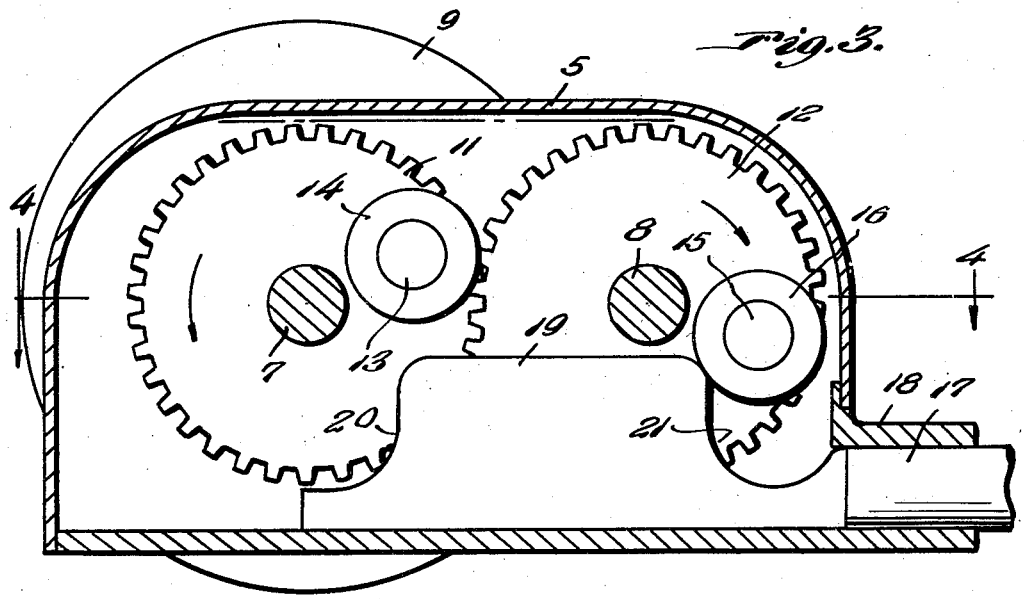
Figure 3 is a longitudinal sectional view through the casing.
Figure 4:
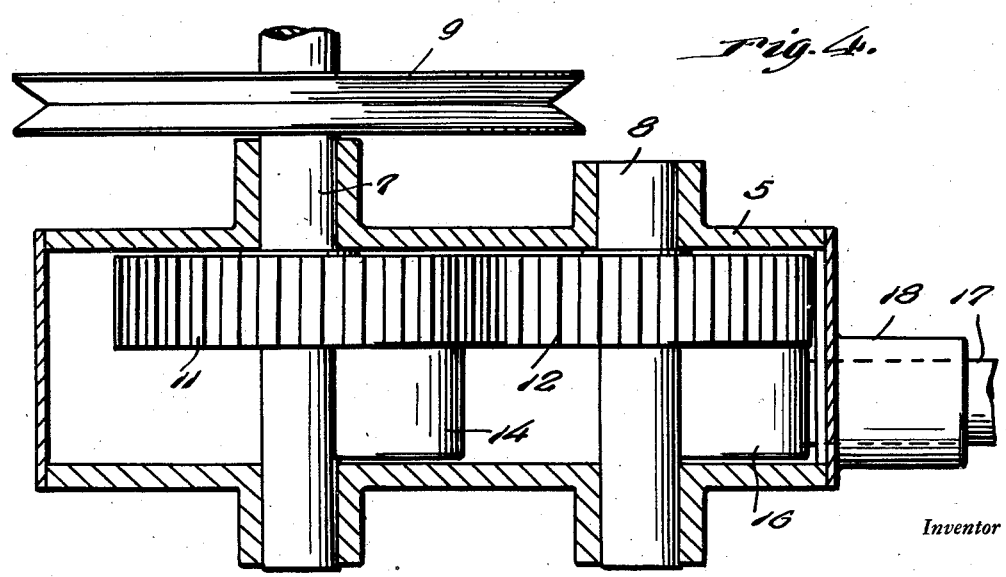
Figure 4 is a sectional view taken substantially on the line 4—4 of Figure 3.

Referring now to the drawings in detail wherein for the purpose of illustration I have disclosed a preferred embodiment of the invention, the numeral 5 designates a casing having bosses 6 on its opposite sides in which shafts 7 and 8 are journaled.

To one end of the shaft 7 is secured a pulley 9 adapted to be driven by a belt or other drive means 10.

A spur gear 11 is secured to the shaft 7 within the casing engaging a similar gear 12 also positioned in the casing and secured to the shaft 8, the gear 11 being driven in a counter-clockwise direction while the gear 12 is driven in a clockwise direction as shown in Figure 3 of the drawings.

A pin 13 is mounted eccentrically on the gear 11 and is provided with a roller 14 freely mounted on the pin while a pin 15 is eccentrically mounted on the gear 12 and is likewise provided with a roller 16 freely mounted on the pin 15.

A rod 17 is reciprocably mounted in a guide 18 at one side of the casing 5 and on the inner end of the rod is formed a head 19 slidably supported on the bottom of the casing, the head being of elongated construction and having its ends curved outwardly as shown at 20 and 21 to provide contacting edges for the rollers 14 and 16 of the gears 11 and 12, respectively, during the rotation of the gears, each of the rollers being timed to engage an adjacent edge of the head to slide or throw the head in opposite directions whereby a reciprocating movement of the rod 17 is produced.

It will be apparent than any suitable cutter or other mechanism may be attached to the outer end of the rod 17 where a reciprocating action thereof is desired.

The casing 5 may be filled or supplied with a suitable lubricant to reduce friction and facilitate operation of the device.

It is believed that the details of construction and manner of use of the device will be readily understood from the foregoing without further detailed explanation.

Having thus described the invention, what I claim is:

Means for converting rotary into reciprocating motion and comprising a pair of shafts, means for driving one of said shafts, interengaged gears secured to the shafts for rotation in opposite directions, a slidably supported member including a laterally projecting head and means eccentrically carried by the gears and engageable with opposite edges of the head to move the latter in opposite directions, said member being slidable in a fixed path, said means last-mentioned comprising a pair of rollers revolved by said gears into engagement with said head alternately and each disengaging said head when the other is engaged therewith.

WILLIAM H. THOMASON.